United States Patent
Pouchelon et al.

(10) Patent No.: US 8,329,307 B2
(45) Date of Patent: Dec. 11, 2012

(54) ANTI-FOULING POLYADDITION SILICONE VARNISH, APPLICATION OF THIS VARNISH TO A SUPPORT AND SUPPORT THUS TREATED

(75) Inventors: Alain Pouchelon, Meyzieu (FR); Maryline Quemin, Lyons (FR)

(73) Assignee: Bluestar Silicones France

( * ) Notice: Subject to any disclaimer, the term of this patent is extended or adjusted under 35 U.S.C. 154(b) by 864 days.

(21) Appl. No.: 12/096,781

(22) PCT Filed: Dec. 7, 2006

(86) PCT No.: PCT/FR2006/002676
§ 371 (c)(1),
(2), (4) Date: Dec. 29, 2008

(87) PCT Pub. No.: WO2007/066011
PCT Pub. Date: Jun. 14, 2007

(65) Prior Publication Data
US 2009/0264035 A1    Oct. 22, 2009

(30) Foreign Application Priority Data
Dec. 9, 2005 (FR) .................................. 05 53821

(51) Int. Cl.
*B32B 27/12* (2006.01)
(52) U.S. Cl. ........ 428/452; 428/447; 525/477; 525/478; 524/493; 524/588; 528/15; 528/31; 528/32; 528/38
(58) Field of Classification Search .................. None
See application file for complete search history.

(56) References Cited

U.S. PATENT DOCUMENTS

| | | | |
|---|---|---|---|
| 4,043,977 A * | 8/1977 | deMontigny et al. ........... 528/15 |
| 5,616,672 A | 4/1997 | O'Brien et al. | |
| 5,658,674 A | 8/1997 | Lorenzetti et al. | |
| 6,425,600 B1 * | 7/2002 | Fujiki et al. ................. 280/728.1 |
| 2001/0056167 A1 * | 12/2001 | Kaiya et al. ..................... 528/18 |
| 2003/0180468 A1 * | 9/2003 | Cray et al. .................... 427/387 |

FOREIGN PATENT DOCUMENTS

| | | |
|---|---|---|
| EP | 0 426 487 A2 | 5/1991 |
| EP | 0 553 840 A1 | 8/1993 |
| EP | 0 764 702 A2 | 3/1997 |
| EP | 0 953 675 A2 | 11/1999 |
| EP | 1 013 817 A2 | 6/2000 |
| EP | 1 046 671 A2 | 10/2000 |
| FR | 2 719 598 A1 | 11/1995 |
| GB | 2 045 788 A A | 11/1980 |
| WO | WO-98/42789 A1 | 10/1998 |
| WO | WO-01/98418 A2 | 12/2001 |
| WO | WO 2008/084747 * | 7/2008 |

OTHER PUBLICATIONS

Preliminary Examination Report for FR 05 53821, dated Aug. 24, 2006.
International Search Report for PCT/FR2006/002676, dated Mar. 26, 2007.
Written Opinion for PCT/FR2006/002676, dated Mar. 26, 2007.

* cited by examiner

*Primary Examiner* — Marc Zimmer
(74) *Attorney, Agent, or Firm* — Marshall, Gerstein & Borun LLP

(57) ABSTRACT

This invention relates to silicon compositions particularly useful for the production of anti-fouling varnishes that can be applied to flexible or bulk supports. In particular, embodiments of the invention are directed to cross-linkable silicone composition that is cross-linkable by polyaddition and includes at least two inter-reactive polyorganosiloxane (POS) species (A) and (B) in the presence of a metal catalyst (C) in order to allow cross-linking by polyaddition; and optionally at least one particulate component (D); at least one cross-linking inhibitor (E); optionally at least one solvent (F); optionally at least one adhesion promoter (G); and optionally at least one functional additive (H) for imparting specific properties.

29 Claims, 1 Drawing Sheet

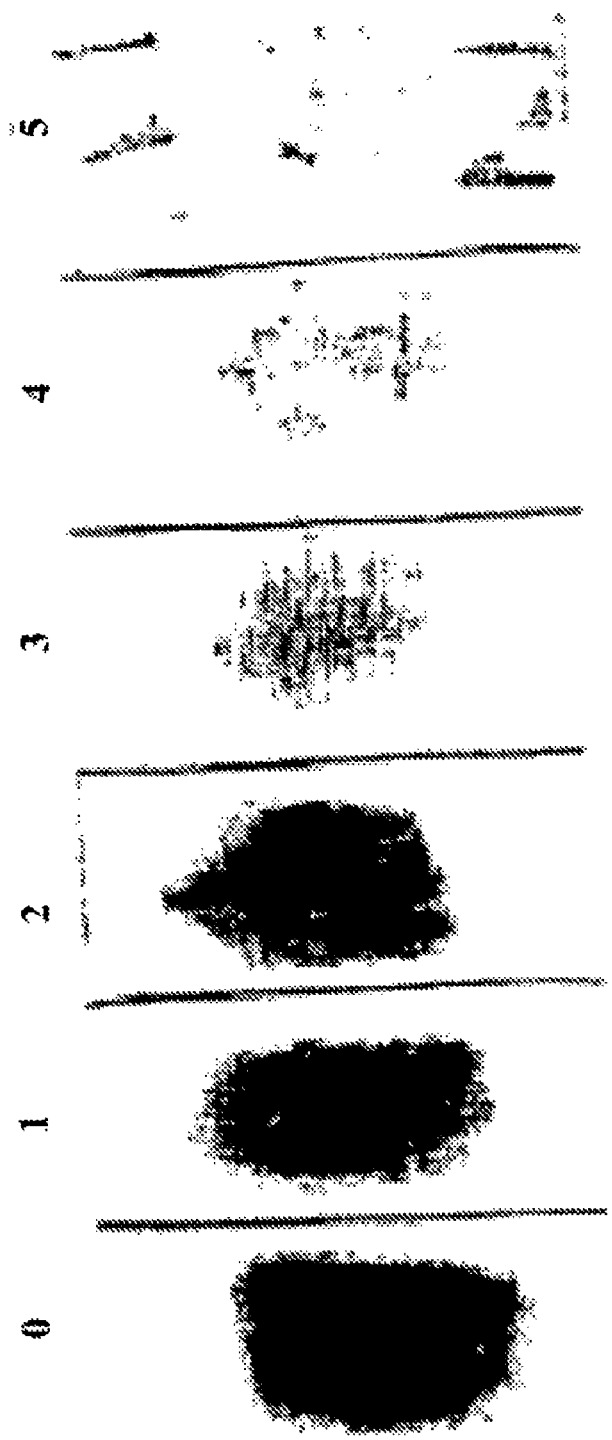

ANTI-FOULING POLYADDITION SILICONE VARNISH, APPLICATION OF THIS VARNISH TO A SUPPORT AND SUPPORT THUS TREATED

FIELD OF THE DISCLOSURE

The general field of the invention is that of polymer coatings or varnishes suitable for conferring on supports optionally at least in part constituted by silicone inter alia, a resistance to fouling, easy utilization, a slippery nature etc.

More precisely, the invention relates to silicone compositions which are useful in particular for producing varnishes which can be applied to supports, the tendency of which in particular to retain dirt, it is sought to reduce. The supports concerned are various and can in particular be constituted:

by flexible supports in particular fibrous, woven or non-woven, coated with at least one protective or mechanical reinforcement layer, based on coating polymer, of the silicone elastomer type, for example; flexible supports made of silicone elastomers reinforced with woven or non-woven fibres by solid supports made of silicone and/or coated with one or more layers of silicone, for examples metal, plastic or ceramic parts (composite parts such as e.g. electric cables and insulators);

or also by polymer or elastomer supports, in particular plastic films, such as for example: thermal-transfer ribbons which can be used in particular as an ink support in thermal-transfer printers or protective wrapping films.

The present invention also relates to the methods for applying the anti-fouling varnish to which it relates, to different supports.

Finally, a subject of the invention is supports coated with such anti-fouling varnish and, in particular:

the flexible supports such as the textile fabrics optionally coated with a layer of silicone elastomer to which the anti-fouling varnish is applied, such fabrics being capable of being used for the production, e.g.:

of textile architecture elements (awnings, shelters, flexible doors etc.) and flexible fire-break membranes
 of certain furnishing fabrics
 of specific garments
 of airbags
 of glass braids
 of conveyor belts
 of compensators
 of thermal-transfer ribbons, for example constituted by plastic films (e.g. made of polyester) carrying ink, which can be used in thermal-transfer printers;
 of protective wrapping films;
 and solid items for example made of silicone elastomers.

BACKGROUND

It is known to coat flexible supports (textiles) or solid supports using films or polymer coatings, for example silicones, preferably in the form of elastomers.

The silicone elastomer coatings on supports which are e.g. fibrous in nature, due to the intrinsic properties of the silicones, already provide numerous advantages for the composites thus formed, namely inter alia good flexibility and good mechanical strength.

Moreover, unlike standard elastomers, the silicones confer upon them inter alia improved high-temperature behaviour and a long life.

These characteristics are widely exploited in the uses of these coated fabrics for the production of airbags.

Thus, the patent FR-B-2.719.598 discloses silicone elastomer compositions which are cold vulcanizable (EVF) by polyaddition, for the coating of textile fabrics made of Nylon® intended for the production of "air bags". These compositions include a mixture formed by:

(I) 25 w/w POS oil ($M^{Vi}DM^{Vi}$): PolyDiMethylSiloxane—PDMS— $\alpha,\omega$ (dimethylvinylsiloxy) with a viscosity of 100,000 mPa·s containing approximately 0.083% mol. of $M^{Vi}$ groups $=(CH_3)_2(CH_2=CH)SiO_{1/2}$, $D^{Vi}=(CH_3)(CH_2=CH)SiO_{2/2}$;

(I') 21 w/w PDMS $M^{Vi}DM^{Vi}$ (10,000 mPa·s), (SiVi=0.083% mol.), (II) 5 w/w POS oil ($M^HDD^HM^H$): poly(dimethylsiloxy)(methylhydrogenosiloxy) $\alpha,\omega$ dimethylhydrogensiloxy, with a viscosity of 300 mPa·s and containing 0.17% mol. of H groups;

(III) Pt catalyst (IV) 5 w/w adhesion promoter (VTMO/GLYMO/Ti(OBu) 4;

(V) optionally a mineral filler, (VI) 0.03 w/w EthynylCycloHexanol (VII) 38 w/w POS vinyl resin=$M^{Vi}DD^{Vi}M^{Vi}Q$ (SiVi 0.6% by weight).

VTMO vinyltrimethoxysilane
GLYMO gamma-Glycycloxypropyltrimethoxysilane
Bu: butyl Nevertheless, it is known that the layers of elastomer silicone coating often have a slightly tacky feel which is disadvantageous for "airbags". This concern for surface slipperiness also applies to coatings for thermal-transfer ribbons (e.g. made of polyester) or also protective wrapping films (e.g. made of polyethylene or polypropylene).

Thermal-transfer ribbons can be used in thermal-transfer printers. These thermal-transfer ribbons are very thin (a few microns) and are coated, on one of their surfaces, with a layer of ink (waxes or resins) and on the other surface, with a protective coating. A very thin protective coating, with a thickness comprised between 0.1 and 1 micrometer is generally used in order to protect the surface of the film and improve the impact of the printing head without deforming the transfer of the ink onto the applied support. In printers whose printing speed is between 150 and 300 mm/s, it is very important for the printing head (flat or wedge-shaped), when it strikes the protective coating of the ribbon, to slide on the surface of the coating, at a high temperature of between 100 and 200° C.

As regards protective wrapping films, it is sometimes envisaged to apply a silicone-based top varnish to them in order to confer anti-adhesion properties on them. However, it is advisable for this top varnish to possess a slipperiness which is at least equivalent to that of the starting plastic film (printed or otherwise).

In all the cases mentioned above by way of illustration, the composites suffer from a lack of slipperiness, which can be associated with mechanical and surface properties (too high a coefficient of friction) of the silicones.

In the case of textile applications, this drawback of a lack of slipperiness is manifested in practice by a low of mobility of the coated fabrics on the work tables which is detrimental to productivity. More specifically in the case of airbags, it is the deployment of the bag during the release of the airbag which can be slowed down in a very harmful manner.

Various types of treatments can be envisaged in order to remedy this difficulty. Nevertheless the compromise between surface slipperiness and properties of use is such that varnishing seems to be one of the means most suited to this purpose.

In the field of architectural textiles or furnishing textiles, manufacturers are moreover requesting "(woven or non-woven) fibrous support/elastomer coating" composites which possess not only the essential characteristics mentioned above, but also significant additional performances such as:

a resistance to fouling, good appearance characteristics in particular with the regard to colour and gloss, suitability for spreading on a silicone, or even non-silicone layer (for example Vinyl PolyChloride, Polyurethane, PolyAmide), easy and economical utilization on an industrial level, and good cohesion of the composites.

These properties can be provided by an appropriate surface coating (varnishing).

The general problem on which the invention is based is therefore the development of a silicone varnish suitable for perfectly fulfilling this role, in particular with respect to antifouling properties.

The PCT Application WO-A-00/59992 (R99035) describes silicone compositions which are useful in particular for producing varnishes which can be applied to supports, the coefficient of friction of which it is sought to reduce. One of these compositions comprises at least one polyorganosiloxane A (POS) which can be cationically and radically cross-linked using functional cross-linking groups (FCG) and a primer C chosen from onium borates, characterized in that it also comprises POS D molecules which are substituted by secondary functional groups (SFG) carried by silicon atoms and selected from those that include at least one alkoxy and/or epoxy and/or carboxy motif and optionally a filler (e.g. silica).

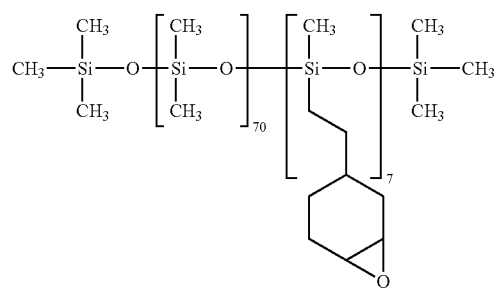

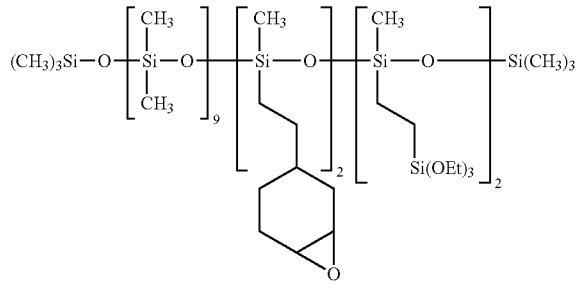

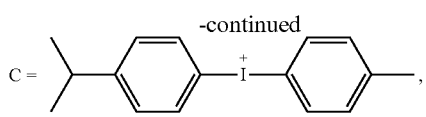

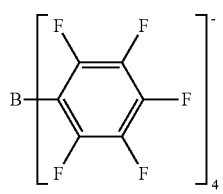

These compositions can moreover comprise fillers and in particular silica fillers which can be for example:

combustion silicas treated with hexamethyldisilazanes or octa-methylcyclotetrasiloxane (specific surface area up to about 300 m$^2$/g), fumed silicas, ground synthetic or natural (polymer) fibres, calcium carbonates, talc, clays, titanium dioxides, etc.

Such compositions are used as anti-fouling varnishes for RTV silicone coatings for airbag fabrics, heat transfer ribbons or packaging films.

Such varnishes are not among the most effective in terms of anti-fouling properties and remain capable of improvement in terms of their coefficient of sliding friction. Moreover, they require the use of particular silicones crosslinkable by a cationic method under UV activation, which allows a margin of improvement from the economic point of view and from the point of view of simplification of the means utilized.

The Application PCT WO-A-WO 03/106564 describes an anti-friction silicone varnish for textiles coated with silicone elastomers. This economical, adherent varnish, providing the sought slipperiness, which is resistant to fouling, and glossy, is formed by a silicone composition cross-linkable by polyaddition comprising, on the one hand, 85 parts of PDMS containing approximately 2.5% of Vi in the form of $D^{Vi}$ groups 15 parts of PDMS α,ω-diMeVi with a viscosity of 600 mPa·s 20 parts of PDMS α,ω diMeVi with a viscosity of 100 Pa·s 0.052 parts of ethynylcyclohexanol 10 parts of γ methacryloxypropyltrimethoxysilane 15 parts of polymethylhydrogensiloxane with a viscosity of 20 mPa·s 0.1 parts of platinum catalyst 5 parts of a particulate component (D), namely Orgasol® 2002 ES3 (PA 12 powder with an average diameter of 30 μm).

The Patent Application WO-A-2004067613 discloses another silicone varnish for anti-fouling coating of silicone composites. This varnish comprises a composition of functional silanes which cross-link under the action of atmospheric humidity said crosslinking being accelerated when hot. This composition is, for example as follows:

Alkenylsilane-A.1-: Vinyltrimethoxysilane (VTMO),

Alkenylsilane-A.2-: Dynasilan® 6490 is a condensate of vinyltrimethoxysilane (VTMO) marketed by Degussa, Component-B.1- of the catalytic system: DADBE: dibutyltin diacetate, Component-B.2- of the catalytic system: TBOT: butyl titanate, Ultrafine filler-C-: R812 is a treated pyrogenated silica marketed by Degussa.

The Patent Application WO-A-2004067620 also discloses another anti-fouling silicone varnish for textiles coated with silicone elastomers. This economical, adherent, non-slip and glossy varnish comprises a cross-linkable silicone composition based on, per 100 parts by weight:

1—at least 80 parts by weight of:

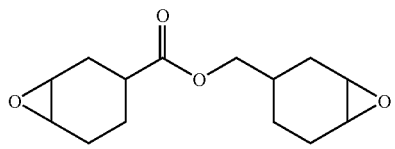
(1.1)

2—from 0.1 to 10 parts by weight of:

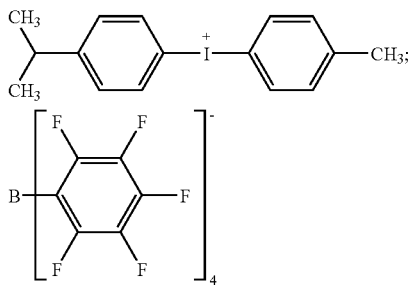

3—from 0 to 10 parts by weight of at least one polydimethylsiloxane (PDMS) acrylate or epoxy;

4—from 0 to 10 parts by weight of at least one silylated compound as defined above and carrying, per molecule, at least one epoxy group;

5—from 0 to 10 parts by weight of at least one PDMS acrylate/epoxy;

6—from 0 to 10 parts by weight of at least one ultrafine filler as defined above;

7—from 0 to 10 parts by weight of at least one thickening agent as defined above;

8—from 0 to 10 parts by weight of at least one other functional additive as defined above.

These last two varnish compositions are very effective but can in certain cases exhibit a few defects in their advantages; in particular their method of cross-linking means that they are very sensitive to the environment in which they are used (humidity, light) which can make them difficult to use in textile-coating machines.

BRIEF DESCRIPTION OF THE DRAWINGS

FIG. 1 is a ranking scale for determining resistance to fouling.

DETAILED DESCRIPTION

In these circumstances, one of the essential objectives of the present invention is to provide improved novel compositions of anti-fouling varnish for various, optionally silicone supports, in particular flexible supports (with fibrous reinforcement) in particular those coated with silicone elastomers or solid supports made of silicone elastomer.

These developments in the novel compositions are expressed at least with respect to the following two qualities:
1. facilitated utilization compared with previous compositions;
2. very good resistance to fouling and, advantageously, vis-à-vis at least one of the other following qualities:
3. good spreading of the composition on a silicone layer;
4. adherence to the support and in particular to the layer of coated silicone elastomer;
5. absence of colour but glossy;
6. adequate mechanical resistance of the surface layer;
7. easily applied to various types of supports;
8. and economical.

Another objective of the invention is to provide a method for simple and economical varnishing of different siliconized or unshaped supports, for example, by woven or non-woven fibrous substrates and coated with a layer of cross-linked silicone elastomer or by solid supports at least constituted in part by silicone, using an anti-fouling varnish based on silica species compatible with the silicone elastomers.

Another essential objective of the invention is to provide a composite comprising a support preferably coated with at least one layer of elastomer and covered with a silicone varnish as defined above, for example, a fabric coated with cross-linked silicone elastomer, with a high resistance to fouling and a low coefficient of friction.

These objectives, inter alia, are achieved by the present invention which relates firstly to a cross-linkable silicone composition which is useful in particular as a varnish having in particular anti-fouling properties, this composition being of the type of those which can be cross-linked by polyaddition and comprising:

at least two inter-reactive organosilica species (A), (B) in the presence of a metal catalyst (C) (preferably platinum) in order to allow cross-linking by polyaddition, these two species being constituted by polyorganosiloxanes (POS), optionally at least one particulate component (D) useful in particular as a filler;

at least one cross-linking inhibitor (E) useful in particular as a regulator;

optionally at least one solvent (F), optionally at least one adhesion promoter (G);

optionally at least one functional additive (H) for conferring specific properties;

characterized in that species (A) comprises at least one POS resin, preferably a POS resin, having, per molecule, at least one C2-C6 alkenyl group bonded to the silicon;

species (B) comprises at least one POS cross-linking agent, preferably a linear or branched POS, having, per molecule, at least two hydrogen atoms bonded to the silicon;

the molar ratio R=SiH/SiVi of the hydrogen species (B) to the alkenyl species (A) is such that $R \geq A$, preferably $R>2$, preferably $R \geq 25$ and, still more preferentially $6 \geq R \geq 11$.

The silicone varnish according to the invention is advantageous in that it makes it possible to greatly increase the resistance to fouling, while being easy to utilize.

The mechanical qualities and the properties of use of the varnish supports by means of the composition according to the invention, are not affected.

Moreover, to the extent that it can be presented in 2 non-reactive parts in isolation, this varnish composition possesses a sufficient stability for use which is deferred, with respect to its production, by a storage period compatible with marketing criteria.

The composition according to the invention leads after spreading and hardening (drying/cross-linking) to a superficial, thin, protective, hard, smooth, glossy and transparent surface layer of varnish on a support, preferably coated with a polymer (for example a silicone elastomer). Within the meaning of the invention, the layer of varnish has for example a substantially homogeneous thickness less than or equal to 15 μm, preferably 5 μm.

It is to the credit of the inventors that they selected POS resins (A) and POS cross-linking agents (B) according to a suitable molar ratio R, these species being cross-linkable by polyaddition in the presence of platinum (C) or another appropriate metal.

These compositions can be applied to silicone coatings and provide them with, in particular:
- a varnished appearance;
- antifouling characteristics;
- and good surface slipperiness In the present disclosure, reference is made to the following "silicone" nomenclature in order to represent the siloxy units ("*Chemistry and technology of silicones*" Walter NOLL Academic Press 1968 Table 1 page 3"):

M: $R_3SiO_{1/2}$ with R=Z or Z" in the formulae (1) and (1") below, $M^{Alk}$: $(R^1)_x(R^2)_y SiO_{1/2}$ with $R^1$=Z or Z"; $R^2$=W or W" in the formulae (1) and (1") below and x+y=3; x=1 or 2 and y=1 or 2—preferably x=2 and y=1, $M^H$: $(R^1)_x(H)_y SiO_{1/2}$ with $R^1$=Z or Z" in the formulae (1) and (1") below; H=Hydrogen and x+y=3; x=1 or 2 and y=1 or 2-preferably x=2 and y=1, D: $R_2SiO_{2/2}$ with R=Z or Z" in the formulae (1) and (1") below, $D^{Alk}$: $R^1R^2SiO_{2/2}$ with $R^1$=Z or Z"; $R^2$=W or W" in the formulae (1) and (1"), $D^H$: $R^1HSiO_{2/2}$ with $R^1$=Z or Z" in the formulae (1) and (1") and H=Hydrogen, T: $RSiO_{3/2}$ with R=Z or Z" in the formulae (1) and (1") below, $T^{Alk}$: $R^2SiO_{3/2}$ with $R^2$=W or W" in the formulae (1) and (1") below, Q: $SiO_{4/2}$.

Preferably, the alkenyl W or W" is a vinyl, the symbol "Alk" is then replaced by the symbol "Vi".

The choice of the POS resin (A) is an important parameter of the invention. Thus, the preferred family of resins (A) includes all the resins each comprising at least two different siloxy units chosen from those of formulae:

$$W_a Z_b SiO_{(4-(a+b))/2} \qquad (1)$$

in which:
the symbols W, identical or different, each represent an alkenyl group;
the symbols Z, identical or different, each represent a non hydrolyzable monovalent hydrocarbon group, without any adverse effect on the activity of the catalyst, optionally halogenated and, preferably chosen from the alkyl groups as well as from the aryl groups,
a is 1 or 2—preferably 1—, b is 0, 1 or 2 and a+b is comprised between 1 and 3,
optionally at least some of the other units are units of average formula:

$$Z_c SiO_{(4-c)/2} \qquad (2)$$

in which Z has the same meaning as above and c has a value comprised between 0 and 3;
at least one of these two different siloxy units being a T or Q unit.

By "alkenyl", is meant a substituted or unsubstituted, linear or branched, unsaturated hydrocarbon chain, having at least one olefin double bond, and more preferably a single double bond. Preferably, the "alkenyl" group has 2 to 8 carbon atoms, better still 2 to 6. This hydrocarbon chain optionally comprises at least one heteroatom such as O, N, S.

Preferred examples of "alkenyl" groups are the vinyl, allyl and homoallyl groups; vinyl being particularly preferred.

By "alkyl", is meant linear or branched, cyclic, saturated hydrocarbon chain, optionally substituted (e.g. by one or more alkyls), preferably with 1 to 10 carbon atoms, for example with 1 to 8 carbon atoms, better still with 1 to 4 carbon atoms.

Examples of alkyl groups are in particular methyl, ethyl, isopropyl, n-propyl, tert-butyl, isobutyl, n-butyl, n-pentyl, isoamyl and 1,1-dimethylpropyl.

The "alkyl" part of the "alkoxy" radical is as defined above. "The alkyl" can be perfluorinated, and by "perfluorinated alkyl", is meant an alkyl comprising at least one perfluoroalkyl group, preferably having the formula:

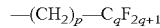
$$-(CH_2)_p-C_q F_{2q+1}$$

in which p represents 0, 1, 2, 3 or 4; q is an integer from 1 to 10; and $C_q F_{2q+1}$ is linear or branched. Preferred examples of this radical are: $-(CH_2)_2-CF_2)_5-CF_3$ and $-(CF_2)_7-CF_3$.

The expression "aryl" designates an aromatic hydrocarbon group, having 6 to 18 carbon atoms, which is monocyclic or polycyclic and preferably monocyclic or bicyclic. It must be understood that, within the framework of the invention, by polycyclic aromatic radical, is meant a radical having two or several aromatic nuclei, condensed (orthocondensed or ortho and pericondensed) with each other, i.e. having, two-by-two, at least two carbon atoms in common.

As an example "of aryl", there can be mentioned e.g. the phenyl radicals.

Advantageously, the ratio of the number of the "M" units/number of "Q" units and/or "T" is 4/1 to 0.5/1. The ratio of the number of "D" units/number of "Q" and/or "T" units is 100/1 to 0.

The resins (A) preferably have a O/Si molar ratio greater than or equal to 0.75; when said ratio is less than or equal to 1, said resins are generally liquids; more viscous products have a O/Si ratio of approximately 1; thermoplastic solid resins or resins with a high softening point are obtained when said ratio is greater than 1.

According to the invention, preference can be given to the resins (A) to those comprising molecules constituted by $M^{Alk}$, M and Q siloxy units and/or molecules constituted by M, $D^{Alk}$ and Q siloxy units.

These resins (A) are well-known branched organopolysiloxane oligomers or polymers which are commercially available. They can be presented in the form of solutions, preferably siloxanic. As examples of branched organopolysiloxane oligomers or polymers, there can be mentioned the MQ resins, the MDQ resins, the TD resins and the MDT resins, the alkenyl functions being able to be carried by the M, D and/or T units. As examples of resins which are particularly suitable, there can be mentioned the alkenylated (e.g. vinylated) MDQ or MQ resins, these alkenyl (e.g. vinyl) groups being carried by the M and/or D units.

Preferably, the POS resin (A) has a content by weight of alkenyl radical(s) comprised between 0.1 and 20% by weight and, preferably, between 0.2 and 10% by weight.

According to a variant, the composition which comprises the species (A) comprises at least one hyperalkenylated POS (A") which is different from a resin, this hyperalkenylated POS (A") comprising siloxyl units of formula:

$$W''_{a''} Z''_{b''} SiO_{(4-(a''+b''))/2} \qquad (1'')$$

in which:
the symbols W", identical or different, each represent an alkenyl group;
the symbols Z", identical or different, each represent a non hydrolyzable monovalent hydrocarbon group, without any adverse effect on the activity of the catalyst, optionally halogenated and, preferably chosen from the alkyl groups as well as from the aryl groups, a" is 1 or 2, b" is 0, 1 or 2 and a"+b" is comprised between 1 and 3, optionally at least some of the other units are units of average formula:

$$Z''_{c''}SiO_{(4-c'')/2} \quad (2'')$$

in which Z" has the same meaning as above and c" has a value comprised between 0 and 3; this hyperalkenylated POS (A") comprising, preferably, molecules of the following formula:

$$(M^{Alk})_n(D)_p(D^{Alk})_q(M)_m$$

in which: $p \geq 0$, $q > 0$, $n+q \geq 3$, preferably $n+q \geq 4$;
n=0, 1 or 2;
m=0, 1 or 2.

The hyperalkenylated POSs (A") can be mostly formed by units of formula (1") or can contain, moreover, units of formula (2"). Similarly, they can have a linear structure. Their degree of polymerization is, preferably, comprised between 2 and 5,000. Their content of alkenyl groups expressed in moles per 100 g of POS is $20 \geq 0.035$ preferably $\geq 2$.

Z" is generally chosen from the methyl, ethyl and phenyl radicals, 60% mol. at least of the Z" radicals being methyl radicals.

Examples of siloxyl units of formula (1") are the vinyldimethylsiloxane unit, the vinylphenylmethylsiloxane unit and the vinylsiloxane unit.

Examples of siloxyl units of formula (2") are the $SiO_{4/2}$, dimethylsiloxane, methylphenylsiloxane, diphenylsiloxane, methylsiloxane and phenylsiloxane units.

Examples of POS (A") are the dimethylpolysiloxanes with dimethylvinylsilyl ends, the methylvinyldimethylpolysiloxane copolymers with trimethylsilyl ends, the methylvinyldimethylpolysiloxanes copolymers with dimethylvinylsilyl ends, the cyclic methylvinylpolysiloxanes.

The dynamic viscosity $\eta_d$ of this POS (A") is comprised between 0.01 and 1000 Pa·s, preferably between 0.01 and 500 Pa·s.

Preferably, the POS (A") comprises at least 98% of $D^{o'}$ siloxyl units: $-R_2SiO_{2/2}$ with R corresponding to the same definition as Z, this percentage corresponding to a number of units per 100 atoms of silicon.

Preferably, the W" alkenyl units are vinyls carried by D and optionally M and/or T siloxyl units.

As regards the species (B), it comprises, preferably, at least one hydrogenated POS (B), this POS (B) comprising siloxyl units of formula:

$$H_dL_eSiO_{(4-(d+e))/2} \quad (3)$$

in which:
H is hydrogen,
the symbols L, identical or different, each represent a non hydrolyzable monovalent hydrocarbon group, with no adverse effect on the activity of the catalyst, optionally halogenated and, preferably chosen from the alkyl groups as well as from the aryl groups,
d is 1 or 2, e is 0, 1 or 2 and d+e has a value comprised between 1 and 3;

optionally, at least some of the other units being units of average formula:

$$L_gSiO_{(4-g)/2} \quad (4)$$

in which L has the same meaning as above and g has a value comprised between 0 and 3;

this hydrogenated POS (B) corresponding, preferably, to molecules of formulae (5) and/or (6) below:

$$(M^H)_r(D)_s(D^H)_t(M)_u \quad (5)$$

in which:
r=0–2;
s=0–50;
t=0–70;
u=0–2;
$r \geq 0$; $s \geq 0$; $t \geq 20$; $u \geq 0$; $r+t \geq 3$ $$(M^H)_{(2w+2)}Q_w \quad (6)$$

formula in which:
w=1 to 6, preferably 1 to 4;
(B) being preferably chosen from the following compounds:
compounds of formula (5) with t=0, u=0, r=2 and s=1 to 20;
compounds of formula (5) with t=1 to 70, u=0, r=2 and s=1 to 50;
compounds of formula (5) with t=1 to 70, u=2, r=0 and s=1 to 50;
compounds of formula (6) with w=1 to 6, preferably 1 to 4; and their mixtures.

As examples of POS (B), there can be mentioned poly (dimethylsiloxane) (methylhydrogenosiloxy) α, ω dimethylhydrogensiloxane, the hydrogenosiloxane resins of type M'Q.

The POSs (B) can be formed only by units of formula (3) or also comprise units of formula (4).

The POSs (B) can have a linear, branched, cyclic or network structure.

The dynamic viscosity $\eta_d$ of this POS (B) is comprised between 5 and 1000 mPa·s, preferably between 10 and 100 mPa·s.

The group L has the same meaning as the Z group above.
Examples of units of formula (3) are: $H(CH_3)_2SiO_{1/2}$, $HCH_3SiO_{2/2}$, $H(C_6H_5)SiO_{2/2}$.

Examples of units of formula (4) are the same as those given above for the units of formula (2).

Examples of POS (B) are:
the dimethylpolysiloxanes with hydrogenodimethylsilyl ends,
the copolymers with (dimethyl)-(hydrogenomethyl)polysiloxane units with trimethylsilyl ends,
the copolymers with dimethyl-hydrogenomethylpolysiloxane units with hydrogenodimethylsilyl ends,
the hydrogenomethylpolysiloxanes with trimethylsilyl ends,
the cyclic hydrogenomethylpolysiloxanes,
the hydrogenosiloxanic resins comprising the siloxyl units M: $R_3SiO_{1/2}$, Q: $SiO_{4/2}$ and/or T: $RSiO_{3/2}$, optionally D: $-R_2SiO_{2/2}$, with R=H or corresponding to the same definition as L.

Advantageously, the concentration $C_B$ of species (B) (in parts by weight for 100 parts by weight of (A)) is such as $C_B \geq 5$, preferably $C_B = 10$, more preferentially $C_B \geq 20$, and, still more preferentially $200 \geq C_B \geq 30$ As other examples of monovalent hydrocarbon groups Z, Z" or L, capable of being present in the abovementioned POSs (A) (A")/(B), there can be mentioned: methyl, ethyl; n-propyl; i-propyl; n-butyl; i-butyl; t-butyl; chloromethyl; dichloromethyl; α-chloroethyl; α,β-dichloroethyl; fluoromethyl; difluoromethyl; α,β-difluoroethyl; trifluoro-3,3,3-propyl; trifluoro cyclopropyl; trifluoro-4,4,4 butyl; hexafluoro-3,3,5,5,5,5 pentyl; β-cyanoethyl; γ-cyanopropyl; phenyl; p-chlorophenyl; m-chlorophenyl; dichloro-3,5-phenyl;

trichlorophenyl; tetrachlorophenyl; o-, p- or m-tolyl; α,α,α-trifluorotolyl; xylyls such as dimethyl-2,3 phenyl; dimethyl-3,4-phenyl.

These groups can be optionally halogenated, or also be chosen from the cyanoalkyl radicals.

The halogens are for example fluorine, chlorine, bromine and iodine, preferably chlorine or fluorine.

The POSs (A) (A") or (B) can be constituted by mixtures of different silicone oils.

The polyaddition reaction specific to the cross-linking mechanism of the varnish according to the invention is well known to a person skilled in the art. A catalyst (C) can also be used in this reaction. This catalyst (C) can in particular be chosen from the platinum and rhodium compounds. The complexes of platinum and an organic product described in the U.S. Pat. No. 3,159,601, U.S. Pat. No. 3,159,602, U.S. Pat. No. 3,220,972 and the European patents EP-A-O 057 459, EP-A-O 188 978 and EP-A-Q 190 530, the platinum and vinylated organosiloxane complexes described in the U.S. Pat. No. 3,419,593, U.S. Pat. No. 3,715,334, U.S. Pat. No. 3,377,432 and U.S. Pat. No. 3,814,730 can in particular be used. The generally preferred catalyst is platinum. In this case, the quantity by weight of catalyst (C), calculated by the weight of platinum-metal, is generally comprised between 2 and 400 ppm, preferably between 5 and 100 ppm based on the total weight of the POSs (A & A'), (B & B').

The optional particulate component (D) is, according to an advantageous alternative, selected from the group of powders comprising particles, preferably substantially spherical, the diameter of which is preferably 1 to 2 times the thickness of the layer of varnish which can be produced from said composition and the density of which is advantageously comparable to that of the silicone composition.

Still more preferably, the particulate component (D) which it contains is selected:

from the group of the non-aggregated particles (optionally hollow or even expandable), in powder or in suspension in suitable solvents, and chosen in particular:

from the group of powders of (co)polyamides—preferably the (co)polyamides 6, 12 and 6/12—comprising particles substantially rounded in shape and with an average diameter Φmd comprised between 0.1 and 50 µm, preferably between 0.5 and 20 µm and still more preferably between 1 and 15 µm;

and/or from the group of silica powders having an average particle diameter Φmd close to or less than 5 µm; these silicas being advantageously colloidal silicas, combustion silicas, and precipitation silicas or their mixtures;

and/or from the group of metal oxides, preferably titanium, cerium or aluminium $Al_2O_3$ or $Al(OH)_3$ (aluminium hydroxide), or also mica powders;

from the group of the structured particles in the form of powder or in suspension in suitable solvents, in particular from the group of the reinforcing silica powders such as treated pyrohydrolysis silica;

and from their mixtures.

According to a preferred characteristic of the invention, the particulate component (D), when it is from the group of (co)polyamide powders, is present at a level of 0.1 to 20% w/w relative to the total mass of the varnish composition. This limited quantity results from the fact that this component cannot be assimilated with a filler influencing the mechanical qualities and properties of use of the varnish support.

According to another preferred characteristic of the invention, the particulate component (D), when it is from the group of silicas, is present at a level of 0.001 to 5% w/w relative to the total mass of the composition.

These fillers (D) can advantageously be treated with a compatibilizing agent such as for example organosilanes or siloxanes or silazanes With respect to weight it is preferably to utilize a quantity of this component of 0.001 to 10 parts, preferably between 1 and 5 parts.

The inhibitors of the addition reaction (E), are chosen from the following compounds: A polyorganosiloxanes, advantageously cyclic and substituted by at least one alkenyl, tetramethylvinyltetrasiloxane and divinyltetramethyldisiloxane being particularly preferred, pyridine, phosphines and organic phosphites, unsaturated amides, alkyl maleates, and acetylenic alcohols.

These acetylenic alcohols, (Cf. FR-B-1 528 464 and FR-A-2 372 874), which are among the preferred hydrosilylation reaction thermal blockers, have the formula:

$$R-(R')C(OH)-C\equiv CH$$

formula in which:

R is a linear or branched alkyl radical, or a phenyl radical;

R' is H or a linear or branched alkyl radical, or a phenyl radical;

the R, R' radicals and the carbon atom situated in a position of the triple bond optionally being able to form a ring;

the total number of carbon atoms contained in R and R' being at least 5, preferably 9 to 20.

Said alcohols are, preferably, chosen from those having a boiling point above 250° C. There can be mentioned as examples:

ethynyl-1-cyclohexanol 1;

methyl-3 dodecyne-1 ol-3;

trimethyl-3,7,11 dodecyne-1 ol-3;

diphenyl-1,1 propyne-2 ol-1;

ethyl-3 ethyl-6 nonyne-1 ol-3;

methyl-3 pentadecyne-1 ol-3.

These α-acetylenic alcohols are commercial products.

Such an inhibitor (E) is present at a level of 3,000 ppm maximum, preferably at a level of 100 to 2000 ppm with respect to the total weight of the organopolysiloxanes (A) and (B).

According to another preferred (but nevertheless optional) characteristic, the composition according to the invention can be presented in the form of a solution in at least one solvent (F), preferably chosen from the group comprising the siloxanic solvents—in particular HexaMethylDiSiloxane (HMDS)—, the organic solvents, advantageously the aromatics—in particular xylene—and/or the alkanes—in particular White Spirit®.—, and their mixtures.

Advantageously, once it comprises solvent (F), the composition according to the invention can be characterized in that it is obtained by utilizing a solution of POS resin (A) and in that the solvent (F) is at least in part that of this solution of POS resin (A).

Preference can be given according to the invention to compositions the $C_F$ concentration of which of solvent F (expressed in w/w with respect to the final mixture) is such that:

$10 \leq C_F \leq 80$ preferably $15 \leq C_F \leq 65$ and still more preferably $20 \leq C_F \leq 60$.

When necessary, the choice of the adhesion promoter (G) depends on the substrate to which the varnish is applied. These are generally functional alkoxylated organosilanes. These silanes are often combined with catalysts which promote their condensation. It can for example comprise one or more alkoxylated organosilanes such as VTMS, γ-methacryloxypropyltrimethoxysilane and/or one or more epoxidated organosilica compounds such as GLYMO and/or one or more chelates and/or metal alkoxides such as tert-butyl titanate.

Moreover, when it is integrated into the formula, this adhesion promoter (G) is preferably present at a level of 0.1 to 10%, preferably 0.5 to 5% and still more preferably 1 to 2.5% by weight with respect to all of the constituents of the preparation.

With respect to any functional additives (H) which may be utilized, these may be covering products such as for example appearance modifiers (pigments/colorants), stabilizers, protective agents (antifungal, fire-resistance, UV-resistant, heat-resistant etc.), hydrophilizing agents, thickening agents, plasticizers or fillers etc. When the preparations used in the method according to the invention comprise a filler, it is preferably mineral. It can be constituted by products chosen from siliceous (or non-siliceous) materials. Siliceous fillers such as diatomaceous earths or ground quartz can thus be used. Moreover examples of non-siliceous fillers which can be used alone or in mixture are carbon black, titanium dioxide, aluminium oxide, aluminium hydroxide, expanded vermiculite, the zirconia, a zirconate, non-expanded vermiculite, calcium carbonate, zinc oxide, mica, talc, iron oxide, barium sulphate and slaked lime. These fillers have a grain size generally comprised between 0.01 and 10 μm and a BET surface area of less than 100 m²/g. It should be noted that the pigmentation can be completed, for example at the time of use.

The viscosity of the non-crosslinked liquid varnish as it is applied to the support can be adjusted by dilution with solvents depending on the application methods used. Thus, the dynamic viscosity η (mPa·s at 25° C.) of the composition diluted in a solvent before application is for example:

$2 < \eta < 500$, preferably $5 < \eta < 200$, and still more preferably $10 < \eta < 150$.

The dynamic viscosity at 25° C., of all the silicone polymers considered in the present disclosure, can be measured using a BROOKFIELD viscosimeter, according to the AFNOR NFT 76 102 standard of February 1972. As regards very fluid products, the viscosity which is dealt with in the present disclosure is the dynamic viscosity at 25° C., known as "Newtonian", i.e. the dynamic viscosity which is measured, in a manner known per se, at a shear rate gradient which is low enough for the viscosity measured to be independent of the velocity gradient.

The preferred varnish composition is of the type of those which can be cross-linked by polyaddition and comprises:

A—100 parts by weight of dry POS resin (A), preferably of formula $MM^{Vi}Q$,

B—35 to 150 parts by weight of POS (B) preferably of formula $(M^H)_{(2w+2)}Q_w$ with w=1 to 6, and still more preferentially of formula $(M^H)V Q$ with v=1 to 4 (e.g. 4), C—0.0005 to 0.1 by weight of Pt as catalyst (C), D1—0 to 50 parts by weight of at least one particulate component (D1) chosen from the group of the powders of (co)polyamides, D2—0 to 50 parts by weight of at least one particulate component (D2) chosen from the group of the silica powders, D3—0 to 50 parts by weight of at least one particulate component (D3) chosen from the group of the reinforcing silica powders, D4—0 to 50 parts by weight of at least one particulate component (D4) chosen from the group of the metal oxide powders, preferably of titanium, cerium or aluminium $Al_2O_3$ (aluminium hydroxide), or also mica powders, E—0.01 to 1, parts by weight of at least one cross-linking inhibitor (E) useful in particular as a regulator F—0 to 800 parts by weight at least one solvent (F), G—0 to 5 parts by weight of at least one adhesion promoter (G);

H—0 to 5, preferably 0 to 10 parts by weight of at least one functional additive (H), (for example 0 to 3 parts by weight of at least one thickening agent).

For reasons of storage, the varnish composition is advantageously presented in the form of an at least two-component system the mixture of which is capable of cross-linking rapidly when hot by polyaddition. The ingredients are then divided into the different parts according to the rules known to a person skilled in the art; in particular the catalyst is separated from the component which comprises the hydrogenosiloxanes.

Given its ease of production, its low-cost and its antifouling properties, the silicone varnish composition according to the invention is likely to have outlets in numerous fields of application and in particular there can be mentioned:

supports with an optionally siliconized, woven or non-woven fibrous core (i.e. coated on at least one of its faces with at least one layer of elastomer);

or also supports constituted by solid items made of silicone and/or siliconized.

According to another of its aspects, the invention relates to a method for varnishing a support, characterized in that the composition as defined above is applied as a varnish, in particular an anti-fouling varnish, to the surface of said support.

According to a variant, the support comprises silicone, preferably silicone elastomer, this silicone advantageously forming at least one coating of said support and the varnish is applied to the surface of the silicone. To put it plainly, it can be a support at least partially coated with at least one layer of elastomer or an item made of silicone.

According to another variant, the method of varnishing a support, in particular a coated textile, is characterized in that the composition as defined above is applied as a varnish, in particular an anti-fouling varnish, to the surface of said support, this surface comprising at least one non silicone (co) polymer, preferably selected from the group comprising: the polyamides, polyolefins (for example PVC), polyesters, their copolymers and their mixtures.

Preferably, this method essentially involves:

coating the support using the varnish composition as defined above, evaporating the solvent and cross-linking the layer of varnish, optionally by thermally activating the cross-linking.

According to an advantageous arrangement of the invention, the varnish composition is applied to the support at an application rate less than or equal to 15 g/m², preferably comprised between 0.5 and 5 g/m².

Concerning the aspect of use of the varnish composition according to the invention, it can be for example applied to a support by any appropriate coating or transfer means (for example a doctor blade, roll coater, photogravure, dynamic screen printing, brush, spraying: spray gun, etc.).

The cross-linking of the liquid silicone varnish composition applied to the support to be coated, is generally activated for example by heating the surface of the support thus coated, to a temperature comprised between 50 and 200° C., clearly taking account of the support's maximum heat resistance.

The activation means are of the type of those known and appropriate for this purpose, for example thermal or I.R. radiation.

Other details are given in this respect in the examples which follow.

The present invention also relates to the varnish (or composite) support endowed with anti-fouling properties and capable of being obtained by the method as referred to above. This composite is characterized in that it comprises a support which is preferably flexible, and still more preferably chosen from the group comprising:
 textiles,
 non-woven fibrous supports,
 polymer films, in particular polyester, polyamide, polyolefine, polyurethane, silicone polyvinyl chloride, optionally a coating integral with at least one of the faces of the support and constituted by at least one layer of silicone elastomer and/or at least one other (co)polymer, and at least one layer of varnish comprising the composition as defined above.

The flexible supports to which the invention relates can be, inter alia, those mentioned above.

According to a possible implementation, the composite according to the invention can be characterized in that the support comprises at least one coating on at least one of its faces, this coating comprising at least one layer of silicone elastomer and/or at least one other (co)polymer and in that the varnish has a thickness less than or equal to 15 µm, preferably less than or equal to 5 µm.

According to another possible implementation, the composite according to the invention (capable of being obtained by the method defined above), can be characterized in that it comprises:

a solid support optionally made of silicone and/or at least partially coated with silicone, the silicone being preferably a silicone elastomer, and at least one layer of varnish comprising the composition according to the invention as defined above.

The coating silicone is optional, for example when the support is itself silicone.

Advantageously, the composite according to the invention can include a support comprising at least one material chosen from the group comprising:
 glass in solid form or in the form of fibres,
 ceramics in solid form or in the form of fibres,
 natural or synthetic polymers, being presented in solid form, in the form of fibres, or in the form of films in particular polyester, polyamide, polyurethane, polyvinyl chloride or silicone,
 cellulosic, ligno-cellulosic materials without solid or fibrous form, in particular papers, cards or the like,
 and their combinations.

The fibrous supports intended to be coated then varnished according to the invention, can be for example fabrics, non-woven fabrics or knitted fabrics or more generally any fibrous support comprising fibres chosen from the group of materials comprising: glass, silica, metals, ceramic, silicon carbide, carbon, boron, natural fibres such as cotton, wool, hemp, linen, artificial fibres such as viscose, or cellulosic fibres, synthetic fibres such as the polyesters, polyamides, polyacrylic, chlorofibres, polyolefins, synthetic rubbers, polyvinyl alcohol, aramids, fluorofibres, phenolics, the silicones etc.

As preferred examples of fibrous supports, there can be mentioned the fabrics made of glass, polyester, polyamide, polyurethane, polyolefin, polyvinyl chloride or silicone, or also papers, cards or the like.

Apart from the flexible textile supports coated with silicone, the anti-fouling varnish according to the invention can be applied to plastic films (for example for protective packaging), e.g. made of polyester, polyurethane, polyamide, polyolefin (polyethylene, polypropylene), polyvinyl chloride, or silicone. These supports are optionally activated in order to promote the keying of the varnish, an activation treatment being for example the "Corona" treatment.

The solid supports to which the invention relates can be, inter alia, items chosen from the group comprising:
 furniture,
 cladding,
 publicity screens,
 windscreens,
 compensators (flexible tight sleeves for piping),
 or filter panels.

According to another of its subjects, the invention includes manufactured articles comprising at least one composite capable of being obtained by the method or at least one composite according to the invention as defined above.

These manufactured articles include any article comprising at least one composite capable of being obtained by the method or at least one composite according to the invention as defined above.

According to yet another of its subjects, the invention comprises the use of the composition defined above, as a varnish, in particular an anti-fouling varnish, on a silicone or non-silicone surface, in particular in order to produce manufactured articles.

The silicone capable of forming the coating or the solid item to which the varnish composition according to the invention is capable of being applied, can be a polyorganosiloxane-based elastomer, which is cross-linkable or at least partially cross-linked, and preferably chosen from:
 the polyaddition or polycondensation RTV silicones,
 and/or the peroxide or polyaddition HVE silicones,
 and/or the polyaddition LSR silicones.

The anti-fouling varnish obtained from the composition, as defined above, is applied to the upper layer(s) of silicone elastomer.

The expressions RTV, LSR, HVE are well known to a person skilled in the art: RTV is the abbreviation for "Room Temperature Vulcanising"; LSR is the abbreviation for "Liquid Silicone Rubber"; HVE is the abbreviation for: "Hot-Vulcanizable Elastomer".

In practice, the invention relates more precisely to supports (for example textiles such as those used for the production of airbags) coated on one and/or other of their faces with a layer of cross-linked RTV, HVE or LSR silicone elastomer, itself coated with a coating of anti-fouling silicone varnish as defined above.

The problem of providing anti-fouling properties is particularly acute with respect to these items or cross-linked silicone elastomer coatings as has already been indicated above, the latter have the characteristic of having a tacky feel.

The polyorganosiloxanes, the main constituents of the adhesive layers of cross-linked elastomers or solid supports/items to which the varnish according to the invention is capable of being applied, can be linear, branched or cross-linked, and comprise hydrocarbon radicals and/or reactive groups such as for example hydroxyl groups, hydrolyzable groups, alkenyl groups and hydrogen atoms. It should be noted that the polyorganosiloxane compositions are fully described in the literature and in particular in the work by Walter NOLL: "Chemistry and Technology of Silicones", Academic Press, 1968, 2nd edition, pages 386 to 409.

It is possible to use a wide variety of monocomponent or bicomponent compositions which crosslink by polyaddition or polycondensation reactions, in the presence of a metal catalyst and optionally of an amine and a cross-linking agent.

The monocomponent or bicomponent polyorganosiloxane compositions which cross-link at room temperature (RTV) or when heated (HVE) by polyaddition reactions, essentially by the reaction of hydrogenosilylated groups on alkenylsilylated groups, generally in the presence of a metal catalyst, preferably platinum, are described for example in the U.S. Pat. Nos. 3,220,972, 3,284,406, 3,436,366, 3,697,473 and 4,340,709.

The monocomponent or bicomponent polyorganosiloxane compositions cross-linking at room temperature (RTV) by polycondensation reactions under the action of moisture, in the presence generally of a metal catalyst, for example a tin compound are described for example in the case of the monocomponent compositions in the U.S. Pat. Nos. 3,065,194, 3,542,901, 3,779,986, 4,417,042, and in the patent FR-A-2 638 752, and in the case of the bicomponent compositions in the U.S. Pat. Nos. 3,678,002, 3,888,815, 3,933,729 and 4,064,096. The polyorganosiloxanes used in these compositions are in general linear, branched or cross-linked polysiloxanes. These RTV polyorganosiloxane compositions which crosslink by polyaddition or polycondensation reactions, advantageously have a viscosity at 25° C. at the most equal to 100,000 mPa·s and, preferably, comprised between 5000 and 50,000 mPa·s.

It is possible to utilize RTV compositions crosslinking at room temperature by polyaddition or polycondensation reactions, having a viscosity at 25° C. greater than 100,000 mPa·s, such as that located in the range from a value greater than 100,000 mPa·s to 300,000 mPa·s; this condition is recommended when filled hardenable compositions are to be prepared, in which the filler(s) used has (have) a tendency to separate by sedimentation.

It is also possible to utilize compositions cross-linking when heated by polyaddition reactions and more precisely so-called compositions of polyaddition HVE type, having a viscosity to 25° C. at least equal to 500,000 mPa·s and preferably comprised between 1 million mPa·s and 10 million mPa·s and even more.

They can also be compositions which can be hardened at a high temperature under the action of organic peroxides such as dichloro-2.4 benzoyl peroxide, benzoyl peroxide, t-butyl perbenzoate, cumyl peroxide and di-t-butyl peroxide. The polyorganosiloxane or gum used in such compositions (simply called HVE-type) is then constituted essentially by siloxyl units (I'), optionally combined with (II') units in which the Z° radical represents a $C_2$-$C_6$ alkenyl group and where x is equal to 1. Such HVEs are for example described in the U.S. Pat. Nos. 3,142,655, 3,821,140, 3,836,489 and 3,839,266). These compositions advantageously have a viscosity at 25° C. at least equal to 1 million mPa·s and, preferably, comprised between 2 million and 10 million mPa·s and even more.

Other polyorganosiloxane compositions which can be varnished with the silicone varnish composition according to the invention are those, monocomponent or bicomponent compositions, which are cross-link when heated by polyaddition reactions, called LSR compositions. These compositions correspond to the definitions given above vis-à-vis the preferred compositions called RTV, except as regards their viscosity which this time is located in the range from a value greater than 100,000 mPa·s to more than 500,000 mPa·s.

Without this being limitative, the silicone elastomer coatings to which the anti-fouling varnish according to the invention can be applied, are more particularly coatings obtained from cold-vulcanizable RTV silicone elastomer compositions, in particular of bicomponent type (RTV 2), by polyaddition.

The examples presented demonstrate the performance of the varnish according to the invention and its advantages relative to the prior art.

EXAMPLES

Experimental Aspects

Textile Support

The sample support is a coating of RTV II applied to a textile support of the woven glass fabric type. The thickness of the coating is sufficient (approximately 250 µm) for the coated surface to be smooth and for the nature of the fabric used to become totally screened.

The composition of the RTV-II used is RHODORSIL (R) TCS 7534 marketed by Rhodia Silicones. In the laboratory, its cross-linking on the support considered is carried out by being left for 2 minutes in a ventilated oven maintained at 160° C.

Varnishing

In the laboratory, the varnish is applied to the silicone support by means of a Mayer bar appropriate for an application of the order of 5 g/m$^2$; the cross-linking is carried out by being left for 2 minutes in a ventilated oven at 180° C.

In order to better adjust the areal weight of varnish applied to the latter can be diluted by a solvent; HexaMethylDiSiloxane is advantageously used, diluting or not diluting with White Spirit.

Characterization of the Varnish

The dynamic viscosity at 25° C. of the non-crosslinked liquid varnish applied to the support is measured using a BROOKFIELD viscosimeter, according to the conditions A3V100 (needle No. 3, velocity 100).

The quality of the cross-linking combined with assessment of the good covering of the fabric are evaluated by a surface-slip measurement. It is possible to have qualitative assessment resulting from the observation made when it is attempted to make the sample slip over a plate of glass. For this purpose the Coefficient of Friction (CoF) of the varnish complex is determined in contact with a plate of glass; the operation is carried out in a plane geometry with a contact surface of 10×5 cm with a load of 200 g.

Test of Resistance to Fouling

The judgment of the quality of the covering of the silicone fabric by the varnish and its resistance to fouling is carried out by means of a carbon black test; the carbon black is applied to the sample to be tested by means of a brush and it is spread by wiping with a piece of cellulose wadding. FIG. 1 illustrates the reference panel that is used for ranking.

Anti-Fouling Polyaddition Silicone Varnish

Raw Materials
  Resin A1
  A silicone resin MD$^{Vi}$Q at 60% in xylene where
  M groups=[$O_{1/2}$ Si $(CH_3)_3$]
  D$^{Vi}$ groups=[$O_{1/2}$ SiCH$_3$C$_2$H$_3$]
  Q groups=[$O_{4/2}$ Si]
and carrying on average 2.5% of —CH=CH$_2$ groups
  Resin A2
  A silicone resin MM$^{Vi}$Q at 60% in xylene and comprising:
  M groups=[$O_{1/2}$ Si $(CH_3)_3$]
  M$^{Vi}$ groups=[$O_{1/2}$ Si $(CH_3)_2$C$_2$H$_3$]
  Q groups=[$O_{4/2}$ Si]

and carrying on average 2.5% —CH=CH$_2$ groups

Crosslinking Agent B1

A PolyDiMethylSiloxane with [O$_{1/2}$Si(CH$_3$)$_2$H] ends which is titrated at 5.5% of SiH groups by weight.

Crosslinking Agent B2

A PolyOrganoSiloxane with [O$_{1/2}$Si(CH$_3$)$_2$H] ends which titrated at 25% of SiH groups by weight.

Crosslinking agent B3

A PolyMethylHydrogenSiloxane with [O$_{1/2}$Si(CH$_3$)$_3$] with a viscosity of 20 mPa·s.

Catalyst C A Karstedt complex titrating 10% by weight of platinum metal.

Cross-linking inhibitor E also hereafter called Regulator EthynylCycloHexanol.

Filler D1

PolyAmide 12 beads with an average diameter of 10 μm marketed under the reference Orgasol® 2001 EXD NAT1 by Arkema.

Filler D2

A pyrohydrolysis silica exhibiting 260 m$^2$/g and treated up to 2.5% expressed in carbon, marketed under the reference Aerosil R812 by Degussa.

EXAMPLES

Examples 1 to 7

The compositions of Table 1 below are used under the conditions described. The slip character and resistance to fouling are qualitatively evaluated according to the panel presented.

TABLE 1

| | parts by weight | | | | | | |
|---|---|---|---|---|---|---|---|
| Resin A1 | 100 | 100 | 100 | 100 | | | |
| Resin A2 | | | | | 100 | 100 | 100 |
| Crosslinking agent B1 | 12 | | | | | | |
| Crosslinking agent B2 | 5.5 | 42 | 100 | | 6 | 18 | 42 |
| Crosslinking agent B3 | | | | 55 | | | |
| Catalyst C | 0.1 | 0.1 | 0.1 | 0.1 | 0.1 | 0.1 | 0.1 |
| Inhibitor/Regulator E | 0.1 | 0.1 | 0.1 | 0.1 | 0.1 | 0.1 | 0.1 |
| Viscosity (mPa · s) | | 9 | 10 | | 8 | | 10 |
| Slip | N | N | Y | N | N | N | Y |
| Fouling | 2-3 | 4 | 4 | 3 | 2 | 3 | 4 |

These tests inform us that a high level of crosslinking agent B is necessary for obtaining a varnish which provides both good surface slip and a high resistance to fouling. Moreover resin A2 seems to require less crosslinking agent than resin A1 and crosslinking agent B2 appears to be the most advantageous.

Examples 8 to 10

The compositions of Table 2 below are applied under the conditions described. The coefficient of friction (CoF) and the resistance to fouling according to the panel presented are qualitatively evaluated.

TABLE 2

| | parts by weight | | |
|---|---|---|---|
| Resin A1 | 70 | | |
| Resin A2 | | 70 | 70 |
| Crosslinking agent B2 | 30 | 30 | 30 |

TABLE 2-continued

| | parts by weight | | |
|---|---|---|---|
| Filler D1 | 1 | 1 | 1 |
| Filler D2 | | | 10 |
| Catalyst C | 0.02 | 0.02 | 0.02 |
| Inhibitor/Regulator E | 0.02 | 0.02 | 0.02 |
| Viscosity (mPa · s) | 14 | | |
| CoF | 0.6 | 0.5 | 0.4 |
| Fouling | 2 | 4 | 4-5 |

These tests confirm the benefit of resin A2 relative to resin A1 and show the advantage with the use of fillers D1 & D2.

The invention claimed is:

1. Cross-linkable silicone composition useful in particular as a varnish having in particular anti-fouling properties, this composition being cross-linkable by polyaddition and comprising:
    at least two inter-reactive polyorganosiloxane (POS) species (A) and (B) in the presence of a metal catalyst (C) in order to allow cross-linking by polyaddition;
    optionally at least one particulate component (D);
    at least one cross-linking inhibitor (E);
    optionally at least one solvent (F),
    optionally at least one adhesion promoter (G);
    optionally at least one functional additive (H) for imparting specific properties;
    wherein
    species (A) comprises at least two different siloxy units chosen from those of formula:

$$W_a Z_b SiO_{(4-(a+b))/2} \quad (1)$$

in which:
W represents an alkenyl group;
Z represents a non-hydrolyzable monovalent hydrocarbon group, without any adverse effect on the activity of the catalyst, optionally halogenated,
a is 0, 1, or 2, b is 0, 1, or 2 and a+b is between 0 and 3,
optionally at least some of the other units are units of average formula:

$$Z_c SiO_{(4-c)/2} \quad (2)$$

in which c has a value between 0 and 3;
at least one of these two different siloxy units being a T or Q unit;
species (B) comprises at least one crosslinking agent POS, having, per molecule, at least two hydrogen atoms bound to the silicon;
a molar ratio R=SiH/SiVi of the hydrogen species (B) to the alkenyl species (A) is greater than or equal to 2;
a concentration $C_B$ of species B is such that $200 \geq C_B \geq 30$ parts by weight for 100 parts by weight of species (A);
a dynamic viscosity η (mPa·s at 25° C.) of the composition before application is such that $2 \leq \eta \leq 500$.

2. Composition according to claim 1, wherein the POS resin of species (A) comprises molecules constituted by $M^{Alk}$, M and Q siloxy units and/or molecules constituted by M, $D^{Alk}$ and Q siloxy units, and wherein Alk refers to at least one bound alkenyl group.

3. Composition according to claim 1, wherein the POS species (A) has a content by weight of alkenyl radical(s) between 0.1 and 20% by weight.

4. Composition according to claim 1, wherein species (B) comprises at least one hydrogenated POS (B), this POS (B) comprising siloxyl units of formula:

$$H_d L_e SiO_{(4-(d+e))/2} \quad (3)$$

in which:
H is hydrogen,
L represents a non-hydrolyzable monovalent hydrocarbon group, without any adverse effect on the activity of the catalyst, optionally halogenated d is 1 or 2, e is 0, 1 or 2 and d+e has a value between 1 and 3;
optionally, at least some of the other units being units of average formula:

$$L_g SiO_{(4-g)/2} \quad (4)$$

in which L has the same meaning as above and g has a value comprised between 0 and 3.

5. Composition according to claim 1, wherein the particulate component (D) is present and comprises particles, the density of the particulate component is comparable to that of the silicone composition.

6. Composition according to claim 1, wherein the particulate component (D) is present and is selected from the group consisting of non-aggregated particles, in powder or in suspension in suitable solvents, particles in the form of reinforcing silica powders, and mixtures thereof.

7. Composition according to claim 1, wherein the composition is in the form of a solution in the at least one solvent (F) wherein the solvent (F) is selected from the group consisting of the siloxanic, organic solvents, and mixtures thereof.

8. Composition according to claim 7, wherein the POS resin of species (A) is a solution and comprises the solvent (F).

9. Composition according to claim 1, wherein a concentration $C_F$ of solvent F (expressed in w/w with respect to the final mixture) is such that:

$$10 \leq C_F \leq 80.$$

10. Composition according to claim 1, comprising:
A 100 parts by weight of dry POS species (A),
B 35 to 150 parts by weight of POS species (B),
C 0.0005 to 0.1 by weight of Pt as the metal catalyst (C),
D1 0 to 50 parts by weight of at least one particulate component (D1) chosen from the group consisting of powders of (co)polyamides,
D2 0 to 50 parts by weight of at least one particulate component (D2) chosen from the group consisting of silica powders,
D3 0 to 50 parts by weight of at least one particulate component (D3) comprising reinforcing silica powders,
D4 0 to 50 parts by weight of at least one particulate component (D4) chosen from the group consisting of metal oxide powders and mica powders,
E 0.01 to 1 parts by weight of at least one cross-linking inhibitor (E),
F 0 to 800 parts by weight at least one solvent (F),
G 0 to 5 parts by weight of at least one adhesion promoter (G);
H 0 to 10 parts by weight of at least one functional additive (H).

11. Method for varnishing a support, comprising applying the composition according to claim 1 as a varnish to a surface of said support.

12. Method according to claim 11, wherein the support comprises silicone forming at least one coating of said support and comprising applying the varnish to a surface of the silicone.

13. Method for varnishing a support, comprising applying a composition according to claim 1 as a varnish to a surface of said support, this surface comprising at least one non silicone (co)polymer selected from the group consisting of polyamides, polyolefins, polyesters, and mixtures and copolymers thereof.

14. Method according to claim 11, comprising coating the support using said composition to form a layer of varnish, and cross-linking the layer of varnish.

15. Composite obtained by the method according to claim 11, comprising:
a support selected from the group consisting of textiles, non-woven fibrous supports, polymer films, and combinations thereof;
optionally a coating integral with at least one of the faces of the support and comprising at least one layer of silicone elastomer and/or at least one other (co)polymer, and,
at least one layer of varnish comprising said composition.

16. Composite according to claim 15, wherein the support comprises at least one coating on at least one of its faces, said coating comprising at least one layer of silicone elastomer and/or at least one other (co)polymer and wherein the varnish has a thickness less than or equal to 15 μm.

17. Composite obtained by the method according to claim 11, comprising:
a solid support optionally made of silicone and/or at least partially coated with silicone,
and at least one layer of varnish comprising said composition.

18. Composite according to claim 15, wherein the support comprises at least one material chosen from the group consisting of:
glass in solid form or in the form of fibers,
ceramics in solid form or in the form of fibers,
natural or synthetic polymers, being presented in solid form, in the form of fibers, or in the form of films,
cellulosic and ligno-cellulosic materials without solid or fibrous form,
and combinations thereof.

19. Manufactured article comprising at least one composite obtained by the method according to claim 11.

20. Composition according to claim 4, wherein the hydrogenated POS (B) comprises molecules of one of formula (5) and/or (6)

$$(M^H)_r(D)_s(D^H)_t(M)_u \quad (5)$$

in which:
r=0-2;
s=0-50;
t=0-70;
u=0-2;
r≧0; s≧0; t≧0; u≧0; r+t≧3

$$(M^H)_{(2w+2)}Q_w \quad (6)$$

formula in which:
w=1 to 6.

21. Composition according to claim 20, wherein the hydrogenated POS (B) comprises molecules of a formula selected from the group consisting of:
molecules of formula (5) with t=0, u=0, r=2 and s=1 to 20;
molecules of formula (5) with t=1 to 70, u=0, r=2 and s=1 to 50;
molecules of formula (5) with t=1 to 70, u=2, r=0 and s=1 to 50;
molecules of formula (6) with w=1 to 6;
and mixtures thereof.

22. Composition according to claim 6, wherein the non-aggregated particles are selected from the group consisting of powders of (co)polyamides; silica powders having an average particle diameter $\phi$ad close to or less than 5 µm; metal oxides, mica powders, and mixtures thereof.

23. Composition according to claim 22, wherein the (co)polyamides are selected from the group consisting of (co)polyamides 6, 12, and 6/12, and comprising particles having a round shape and an average diameter $\phi$md between 0.1 µm and 50 µm.

24. Composition according to claim 22, wherein the silica powder is selected from the group consisting of colloidal silicas, combustion silicas, precipitation silicas, and mixtures thereof.

25. Composition according to claim 22, wherein the metal oxide is selected from the group consisting of titanium oxide, cerium oxide, $Al_2O_3$, $Al(OH)_3$, and mixtures thereof.

26. Composition according to claim 6, wherein the structure particle is selected from the group consisting of reinforcing silica powders.

27. Composition according to claim 26, wherein the reinforcing silica powder is treated pyrohydrolysis silica.

28. Method according of claim 11, wherein the composition comprises particles having an average diameter that is 1 to 2 times the thickness of the varnish.

29. Composite according to claim 15, wherein the composition comprises particles having an average diameter that is 1 to 2 times the thickness of the layer of varnish layer and the density of the particles is comparable to that of the silicone composition.

* * * * *